United States Patent [19]

Ramanathan

[11] Patent Number: 4,517,358
[45] Date of Patent: May 14, 1985

[54] DISAZO BIS-BENZTHIAZOLYL COMPOUNDS

[75] Inventor: Visvanathan Ramanathan, Basel, Switzerland

[73] Assignee: Ciba-Geigy Corporation, Ardsley, N.Y.

[21] Appl. No.: 418,177

[22] Filed: Sep. 14, 1982

[30] Foreign Application Priority Data

Sep. 22, 1981 [CH] Switzerland ............... 6106/81

[51] Int. Cl.³ ............ C09B 35/03; C09B 35/26; C09B 44/08; C09B 44/20
[52] U.S. Cl. .................... 534/608; 106/23; 106/288 Q; 534/589; 534/704; 534/727; 534/758; 534/788
[58] Field of Search .................. 260/158, 146 R

[56] References Cited

U.S. PATENT DOCUMENTS 3,271,383 9/1966 Yamaya et al. ............ 260/158
3,646,004 2/1972 Horstmann et al. ........ 260/152
3,759,894 9/1973 Angliuer et al. ........... 260/158

*Primary Examiner*—Floyd D. Higel
*Attorney, Agent, or Firm*—Wenderoth, Lind & Ponack

[57] ABSTRACT

Cationic disazo compounds of the formula

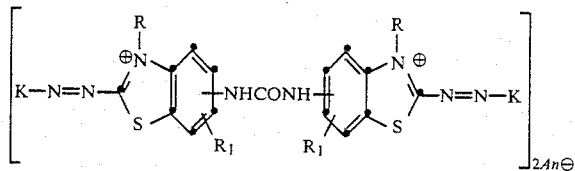

wherein

K independently of one another are each a coupling component,

R independently of one another are each an unsubstituted or substituted $C_1-C_4$-alkyl group, $R_1$ independently of one another are each hydrogen, unsubstituted or substituted $C_1-C_4$-alkyl, unsubstituted or substituted $C_1-C_4$-alkoxy, or halogen, and An is an anion are useful as dyes, in particular as paper dyes, whereby dyeings fast to water are obtained. The dyeings obtained have very good fastness to light and to wet processing.

Disazo compounds of the formula

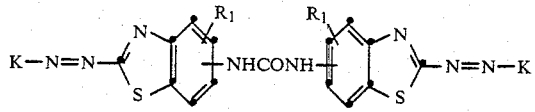

wherein K and $R_1$ are as defined above are useful as disperse dyes and as intermediates in the preparation of the above cationic disazo compounds.

8 Claims, No Drawings

DISAZO BIS-BENZTHIAZOLYL COMPOUNDS

The invention relates to novel cationic disazo compounds, to processes for producing them, and to their use as dyes for dyeing and printing textile materials, leather and particularly paper.

The novel cationic disazo compounds correspond to the formula I

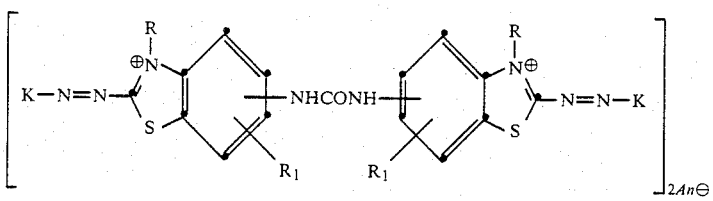

wherein
K independently of one another are each a coupling component,
R independently of one another are each an unsubstituted or substituted $C_1$–$C_4$-alkyl group,
$R_1$ independently of one another are each hydrogen, unsubstituted or substituted $C_1$–$C_4$-alkyl, unsubstituted or substituted $C_1$–$C_4$-alkoxy, or halogen (fluorine, chlorine or bromine), and
An is an anion.

Preferred disazo compounds correspond to the formula I wherein each K has the same meaning as the other K, each R the same meaning as the other R, and each $R_1$ the same meaning as the other $R_1$, and wherein the —NH—CO—NH— bridge is in the p-position with respect to the N atom of the benzothiazole group.

As a coupling component, K can be for example: the radical of an acetoacetic acid anilide, of a phenol, of an aminopyrimidine, of a pyridone, quinolone, pyrazolone, aminopyrazole, indole, aniline, aminopyridine, naphthol, naphthol carboxylic acid anilide, naphthylamine, aminothiazole and thiophene. These radicals can be substituted for example by: $C_1$–$C_4$-alkyl groups, —($CH_3$, —$C_2H_5$, n—$C_3H_7$, iso—$C_3H_7$, —$CH_2NH_2$, —$C_2H_4OH$, —$C_2H_4Cl$), $C_1$–$C_4$-alkoxy groups (—$OCH_3$, —$OC_2H_5$, n—$OC_3H_7$, iso—$OC_3H_7$, —$OC_2H_4OH$, —$OC_2H_4Cl$), or halogen (F, Cl, Br), $NO_2$, OH, CN and/or N(alkyl)$_2$, such as

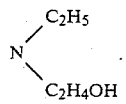

The following are particularly interesting in this connection:
the aminopyrazole radical of the formula

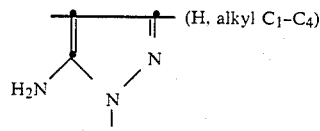

(H, phenyl or alkyl $C_1$–$C_4$ unsubstituted or substituted for example by halogen, OH or alkoxy $C_1$–$C_4$);

the indole radical of the formula

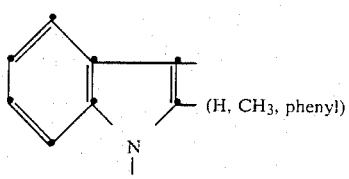

(H, alkyl $C_1$–$C_4$ unsubstituted or substituted for example by halogen, OH or alkoxy $C_1$–$C_4$);
the aniline radical of the formula

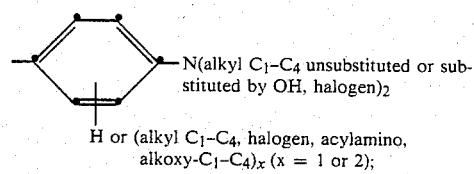

or a radical of a coupling component of the formula

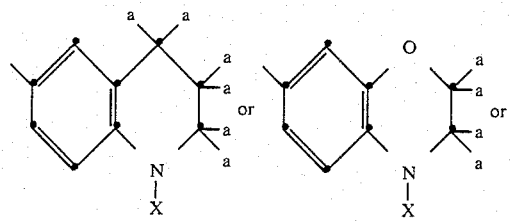

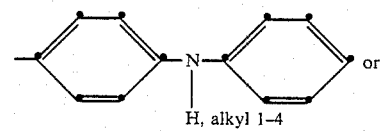

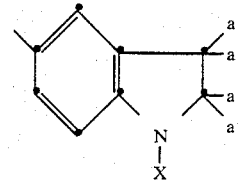

wherein the positions "a" denote either hydrogen or a $C_1$–$C_4$-alkyl group, particularly $CH_3$, and the symbol "X" signifies hydrogen, phenyl or unsubstituted or substituted $C_1$–$C_4$-alkyl, and substituents are for example phenyl, OH, Cl or $C_1$–$C_4$-alkoxy; or the naphthylamine radical of the formula

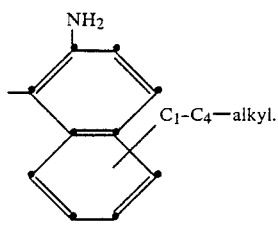

R as a $C_1$-$C_4$-alkyl group is a straight-chain or branched-chain alkyl group, such as the methyl, ethyl, n- or isopropyl group or the n-, sec- or tert-butyl group; these groups can be substituted, for example by OH or halogen, such as fluorine, chlorine or bromine, by $CONH_2$ or by phenyl. In the preferred disazo compounds, R is a $-C_2H_4CONH_2$, $-CH_2-CHOH-CH_3$ or $-CH_3$ group.

As a $C_1$-$C_4$-alkyl group, $R_1$ is a straight-chain or branched-chain alkyl group, such as the methyl, ethyl, n- or iso-propyl group or the n-, sec- or tert-butyl group; and these groups can be substituted for example by halogen, such as fluorine, chlorine or bromine, or by OH or CN.

As a $C_1$-$C_4$-alkoxy group, $R_1$ is a straight-chain or branched-chain alkoxy group, such as the methoxy, ethoxy, n- and iso-propoxy group or the n- and iso-butoxy group; and these groups can be substituted for example by $C_1$-$C_4$-alkyl, $C_1$-$C_4$-alkoxy, halogen, OH or CN.

In preferred disazo compounds, $R_1$ is hydrogen.

Anions An are both inorganic and organic anions: they are for example the halide ion, such as the chloride, bromide or iodide ion, also the sulfate, methylsulfate, aminosulfate, perchlorate, carbonate, bicarbonate, phosphate, phosphomolybdic, phosphotungstic, phosphotungstomolybdic, benzenesulfonate, naphthalenesulfonate, 4-chlorobenzenesulfonate, oxalate, maleate, formate, acetate, propionate, lactate, succinate, chloroacetate, tartrate, methanesulfonate or benzoate ions, or complex anions, such as those of zinc chloride double salts.

Preferred anions An are the formate, acetate, lactate, chloride, sulfate and phosphate ions.

Particularly interesting disazo compounds which yield on paper materials excellent dyeings, fast to light and to wet processing, correspond to the formula

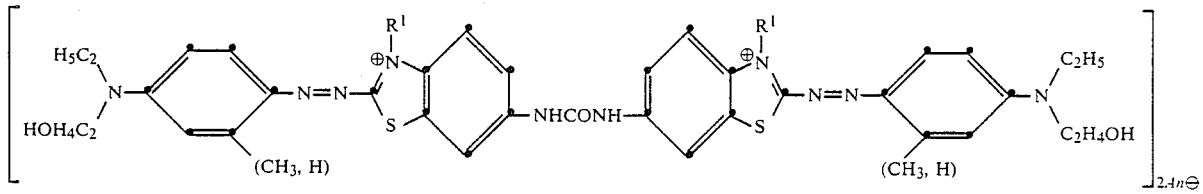

wherein
R' is $C_2H_4CONH_2$, $CH_2-CHOH-CH_3$ or $CH_3$, and An is an anion.

The novel disazo compounds of the formula I are, depending on the coupling component, orange-coloured to blue compounds, which can be produced in a known manner.

One possibility for producing them is for example to treat disazo compounds of the formula II

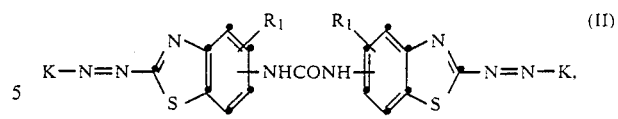

wherein the symbols K and $R_1$ have the meanings defined under the formula I, with a quaternising agent introducing the "R" group.

The quaternising reaction is performed in a known manner; it can be carried out for example in an inert solvent, such as chlorobenzene, in the presence or absence of an inorganic base, such as magnesium oxide, or alternatively in an aqueous suspension, or without solvent and in an excess of the quaternising agent, at a temperature of about 20° to 120° C.

Suitable quaternising agents introducing the "R" group are for example: alkyl halides, such as methyl or ethyl chloride, methyl, ethyl or butyl bromide, or methyl or ethyl iodide, particularly however alkyl sulfates, such as dimethyl, diethyl and dibutyl sulfate, benzyl chloride, chloroacetic acid amide, acrylic acid ester or -amide, epoxides, such as ethylene oxide, epichlorohydrin and alkyl esters of aromatic sulfonic acids, such as methyl-p-toluenesulfonate, methylbenzenesulfonate, as well as the propyl and butyl esters of benzenesulfonic acid.

After the quaternising reaction, the novel cationic disazo compounds of the formula I are separated from the reaction medium and dried. If desired or necessary, it is possible to exchange in these compounds the anion "An" for another anion.

The disazo compounds of the formula II are novel; these compounds are obtained for example
(a) by reducing the nitro group of the benzothiazole compound of the formula III

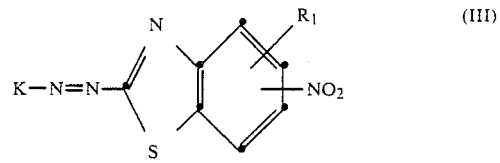

to the corresponding amino group (for example by means of sodium sulfide), or saponifying the acylamino group of the benzothiazole compound of the formula IIIa

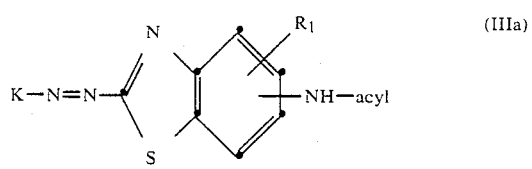

to the corresponding amino compound (for example by means of dilute $H_2SO_4$), and in each case condensing the resulting amino compound with phosgene; in the formulae III and IIIa, the symbols K and $R_1$ have the meanings defined under the formula I; or (b) by tetrazotising a diamino compound of the formula IV

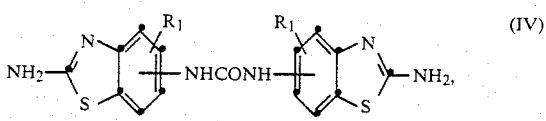

and coupling the resulting product with 2 mols of the same coupling component or with 1 mol of each of two different coupling components, the diamino compounds of the formula IV for their part being obtained by condensing for example 2 mols of the amino compound of the formula V

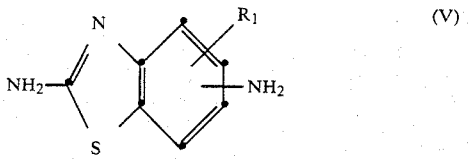

with phosgene; or (c) by cyclising a diamino compound of the formula

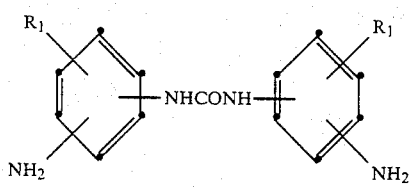

for example by means of alkali rhodanide in the presence of bromine, to the benzothiazole ring.

The disazo compounds of the formula II can be used as disperse dyes.

The novel cationic disazo compounds of the formula I are used in particular as dyes for dyeing and, with the addition of binders and optionally solvents, for printing materials dyeable with basic and cationic dyes, especially textile materials which consist, for example, advantageously of homo- or copolymers of acrylonitrile, or synthetic polyamides or polyesters modified by acid groups. Dyeing is preferably performed in an aqueous, neutral or acid medium by the exhaust process, optionally under pressure, or by the continuous process. The textile material can be in the widest variety of forms: for example in the form of fibres, filaments, fabrics knitwear, piece goods and finished articles, such as shirts or pullovers.

It is possible by application of the dyes to produce level dyeings and printings which are distinguished by very good general fastness properties, especially by a very high degree of exhaustion and by good fastness to wet processing.

Furthermore, the novel disazo compounds of the formula I can be used also for dyeing polyacrylonitrile materials in the spinning solution, and for dyeing and printing natural and regenerated cellulose materials, particularly cotton and viscose, in which cases there are likewise obtained deeply coloured dyeings.

The novel disazo compounds of the formula I have on these textile materials good substantivity and a high degree of exhaustion, and the dyeings obtained have very good fastness properties, especially very good fastness to wet processing.

Moreover, these novel disazo compounds of the formula I can also be used in jet printing, and for dyeing polyacrylonitrile wet tow, and as stamping ink.

A further preferred use of the novel disazo compounds of the formula I is for dyeing of paper of all types, particularly bleached, unsized and sized, lignin-free paper. These compounds are exceptionally suitable for dyeing unsized paper (tissues) by virtue of their very high affinity for this substrate.

The novel disazo compounds of the formula I exhaust very well onto these substrates, the waste liquors being left colourless, a factor which is of great ecological advantage, especially in view of the present-day effluent laws.

The dyeings obtained have very good fastness to light and to wet processing, that is to say, they exhibit no tendency to bleed when dyed paper in the wet state is brought into contact with moist white paper. This property is particularly desirable for so-called "tissues", in the case of which it is foreseeable that the dyed paper in the wet condition (for example soaked with water, alcohol, tenside solution, and so forth) will come into contact with other surfaces, such as with those of textiles, paper, and the like), which have to be protected from becoming contaminated.

The high affinity for paper and the high rate of exhaustion of the novel dyes of the invention are of great advantage in the continuous dyeing of paper, and thus render possible a much wider field of application of this known economical process.

Finally, the novel disazo compounds according to the invention can also be used for dyeing leather (by for example spraying, brushing and dipping), and for the preparation of inks.

The following Examples further illustrate the invention without the scope thereof being limited by them. Except where otherwise stated, 'parts' are parts by weight, and temperature values are given in degrees Centigrade.

EXAMPLE 1

7.4 parts of N,N'-bis[2, {4'-(N-ethyl-N-hydroxyethyl)-amino-2'-methyl-phenylazo}benzothiazol-6-yl]-urea, 7.4 parts of acrylamide, 70 parts by volume of glacial acetic acid and 3 parts by volume of concentrated hydrochloric acid are slowly heated to 95°–100° C.; the mixture is stirred at this temperature for 1 hour, and is then concentrated in vacuo; the residue is subsequently dissolved in hot water and, after filtration of the solution, the dye is salted out from the filtrate. The precipitated dye of the formula

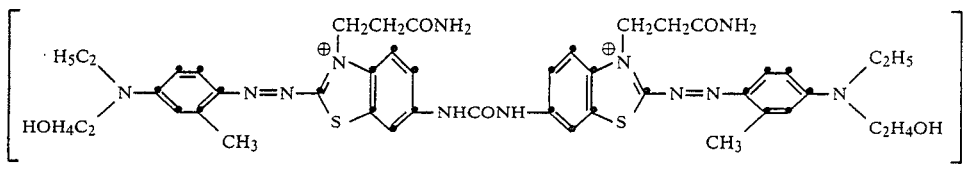

2 Cl⊖ is filtered off, washed with 10% aqueous sodium chloride solution and dried. From an aqueous solution, it dyes paper pulp in blue shades, the waste liquor being left virtually colourless.

The starting substance, N,N'-bis[2,[4'-(N-ethyl-N-hydroxyethyl)-amino-2'-methyl-phenylazo]-benzothiazol-6-yl]-urea is produced as follows: 11.6 parts of 2-[4'-(N-ethyl-N-hydroxyethyl)-amino-2'-methyl]-phenylazo]-6-nitrobenzothiazole, 7.5 parts of sodium sulfide and 100 parts by volume of alcohol are refluxed, with stirring, at 80° C. for 2 hours. After this time, the starting dye has disappeared in the thin-layer chromatogram. The mixture is cooled, filtered at room temperature, and the suction-filter cake is washed with alcohol and afterwards with water.

The dye used for the above reduction process is produced by known methods, for example by coupling diazotised 2-amino-6-nitrobenzothiazole with N-ethyl-N-hydroxyethyl-m-toluidine.

3.55 parts of the reduction product thus obtained and dried are dissolved in 50 parts of acetone and 20 parts of water. Phosgene gas is passed at 20°-25° C. through the solution, while simultaneously the pH of the reaction mixture is maintained at 5 by adding dropwise an aqueous sodium hydroxide solution. The course of the reaction is checked by thin-layer chromatography. After completion of the reaction, acetone is removed in vacuo; the product which has precipitated (starting substance) is then filtered off, washed with water until free from salt and finally dried.

EXAMPLE 2

7 parts of N,N'-bis[2,{4'-(N-ethyl-N-hydroxyethyl)-amino-phenylazo}benzothiazol-6-yl]-urea are stirred into 70 parts of glacial acetic acid, and 6 parts of propylene oxide are then added. The mixture is heated to 60°-65° C., and stirred at this temperature for 2 hours. It is subsequently concentrated in vacuo; the residue is dissolved in hot water and filtered until clear. The solution contains the dye of the formula

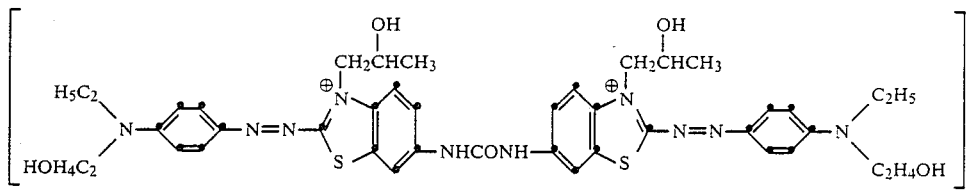

2 CH₃COO⊖ which dyes paper pulp in blue shades, the waste liquor being left practically colourless.

EXAMPLE 3

7 parts of N,N'-bis[2,{4'-(N-ethyl-N-hydroxyethyl)-amino-phenylazo}-benzothiazol-6-yl]-urea are suspended in 60 parts of dimethylformamide, and the suspension is heated to 95°-100° C. There are then added dropwise 3.8 parts of dimethyl sulfate, and stirring is maintained at 95° C. for 5 hours. The mixture is cooled, and 200 parts of benzene are added. The product which has precipitated is filtered off; it is subsequently dissolved in hot water, with the addition of a small amount of acetic acid, and afterwards filtered clear. The dye is salted out of the solution with sodium chloride. The separated dye of the formula

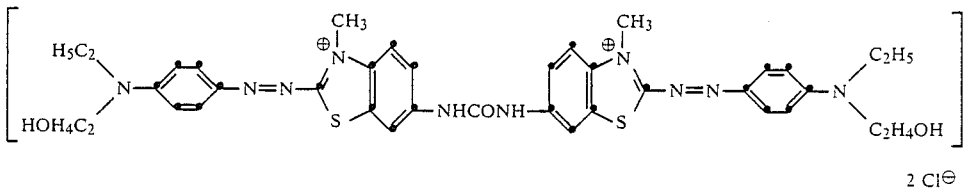

2 Cl⊖ is filtered off and dried. From an aqueous/acetic acid solution, it dyes paper pulp in blue shades, the waste liquor being left practically colourless.

The dyes listed in the following Table are obtained by carrying out the procedure in a manner analogous to that described in Examples 1 to 3.

TABLE

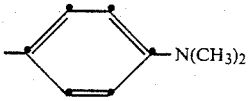

| Example | −NHCONH− Bridge position | R₁ | K | R | An | Colour on paper | Procedure analogous to Example |
|---|---|---|---|---|---|---|---|
| 4 | 6,6' | H | 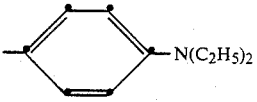 | −CH₂CH₂OH | acetate | blue | 2 |
| 5 | 6,6' | H | 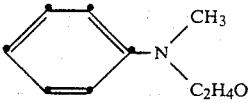 | CH₂CHCH₃<br>    \|<br>   OH | acetate | blue | 2 |
| 6 | 6,6' | H |  | −C₂H₄CONH₂ | chloride | blue | 1 |
| 7 | 6,6' | 5,5'-CH₃ | 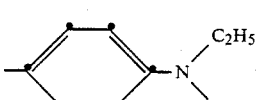 | −CH₂CH₂OH | lactate | blue | 2 |
| 8 | 5,5' | H | 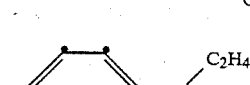 | −CH₃ | metho-sulfate | blue | 3 |
| 9 | 6,6' | H | 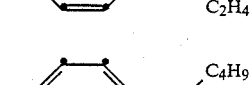 | −C₂H₄CONH₂ | chloride | blue | 1 |
| 10 | 6,6' | 5,5'-OCH₃ | 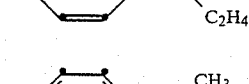 | −C₂H₄CONH₂ | chloride | greenish blue | 1 |
| 11 | 6,6' | H | 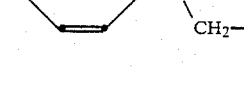 | −C₂H₄CONH₂ | lactate | blue | 1 |
| 12 | 6,6' | H |  | −CH₂CH−CH₃<br>     \|<br>    OH | formate | blue | 2 |

TABLE-continued $$\left[ K-N=N-\underset{S}{\overset{\overset{R}{\underset{N\oplus}{|}}}{C}} -\underset{R_1}{\overset{4}{\underset{7}{\bigcirc}}}\underset{6}{\overset{5}{-}} NHCONH-\underset{R_1}{\overset{4'}{\underset{7'}{\bigcirc}}}\underset{6'}{\overset{5'}{-}}\underset{S}{\overset{\overset{R}{\underset{N\oplus}{|}}}{C}}-N=N-K \right]_2 An^\ominus$$

| Example | —NHCONH— Bridge position | $R_1$ | K | R | An | Colour on paper | Procedure analogous to Example |
|---|---|---|---|---|---|---|---|
| 13 | 5,5' | H | ⌬—N(C₂H₅)(C₂H₄CN) | —C₂H₄CONH₂ | chloride | blue | 1 |
| 14 | 6,6' | 5,5'-Cl | ⌬—N(C₂H₄OCH₃)₂ | —C₂H₄CONH₂ | chloride | blue | 1 |
| 15 | 6,6' | H | ⌬(CH₃)—N(C₂H₅)₂ | —C₂H₄CONH₂ | chloride | blue | 1 |
| 16 | 6,6' | H | ⌬(CH₃)—N(C₂H₄OH)₂ | —C₂H₄CONH₂ | chloride | blue | 1 |
| 17 | 6,6' | H | ⌬(CH₃)—N(C₂H₅)(C₂H₄OH) | —CH₂CH₂OH | formate | blue | 2 |
| 18 | 6,6' | H | ⌬(Cl)—N(CH₃)₂ | —CH₂CH(OH)—CH₃ | acetate | blue | 2 |
| 19 | 6,6' | H | tetrahydroquinoline-N-CH₃ | —CH₂CH₂OH | phosphate | greenish blue | 2 |
| 20 | 6,6' | H | tetrahydroquinoline-N-C₂H₅ | C₂H₄CONH₂ | chloride | greenish blue | 1 |

TABLE-continued

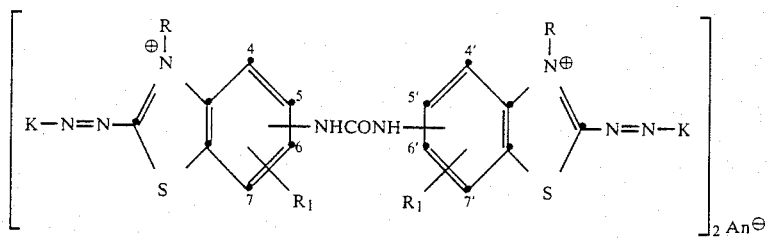

| Example | —NHCONH— Bridge position | $R_1$ | K | R | An | Colour on paper | Procedure analogous to Example |
|---|---|---|---|---|---|---|---|
| 21 | 6,6' | 5,5'-CH$_3$ | (4-(N-CH$_2$-,N-C$_2$H$_4$OH)aminophenyl) | —C$_2$H$_4$CONH$_2$ | bromide | greenish blue | 1 |
| 22 | 6,6' | H | (4-(N-C(CH$_3$)$_2$C(CH$_3$)$_3$, N-C$_2$H$_5$)aminophenyl) | —CH$_2$CH(OH)—CH$_3$ | acetate | greenish blue | 2 |
| 23 | 6,6' | H | (4-(N-C(CH$_3$)$_2$C(CH$_3$)$_3$, N-C$_2$H$_4$OH)aminophenyl) | —CH$_2$CH(OH)—CH$_3$ | acetate | greenish blue | 2 |
| 24 | 6,6' | H | (indoline, N-CH$_3$) | —CH$_2$CH(OH)—CH$_3$ | acetate | greenish blue | 2 |
| 25 | 6,6' | H | (indoline, N-C$_2$H$_4$OH) | —CH$_2$CH(OH)—CH$_3$ | acetate | greenish blue | 2 |
| 26 | 6,6' | H | (4-(N-CH(CH$_3$)—, N-C$_2$H$_5$)aminophenyl) | —CH$_2$CH$_2$OH | phosphate | greenish blue | 2 |
| 27 | 6,6' | H | (benzofuran-substituted-N-C$_2$H$_4$OH) | —CH$_2$CH(OH)—CH$_3$ | acetate | greenish blue | 2 |
| 28 | 6,6' | H | (benzofuran, C(CH$_3$), N-C$_2$H$_4$OCH$_3$) | —CH$_2$CH(OH)—CH$_3$ | acetate | greenish blue | 2 |

TABLE-continued

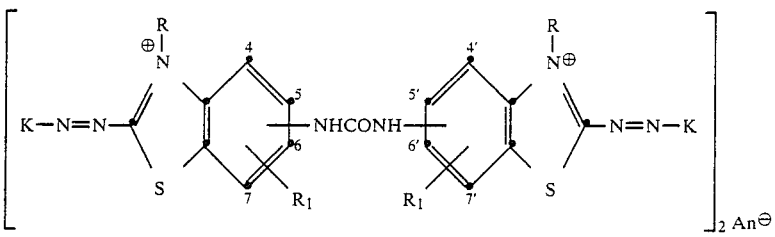

| Example | —NHCONH— Bridge position | R₁ | K | R | An | Colour on paper | Procedure analogous to Example |
|---|---|---|---|---|---|---|---|
| 29 | 6,6' | H | (3-methyl-N-ethyl-oxazinone structure) | —CH₂CH(OH)—CH₃ | acetate | greenish blue | 2 |
| 30 | 6,6' | H | (N-methyl diphenylamine) | —C₂H₄CONH₂ | chloride | greenish blue | 1 |
| 31 | 6,6' | 5,5'-CH₃ | (N-ethyl diphenylamine) | —C₂H₄CONH₂ | phosphate | greenish blue | 1 |
| 32 | 6,6' | H | (N-(2-hydroxyethyl) diphenylamine) | —CH₂CH(OH)—CH₃ | formate | greenish blue | 2 |
| 33 | 6,6' | H | (aminonaphthyl) | —CH₂CH(OH)—CH₃ | tartrate | reddish brown | 2 |
| 34 | 5,5' | H | (aminonaphthyl-CH₂NH₂) | —CH₂CH(OH)—CH₃ | acetate | reddish brown | 2 |
| 35 | 6,6' | H | (5-amino-1-phenylpyrazole) | —CH₂CH(OH)—CH₃ | acetate | reddish brown | 2 |

TABLE-continued

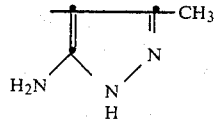

| Example | —NHCONH— Bridge position | R₁ | K | R | An | Colour on paper | Procedure analogous to Example |
|---|---|---|---|---|---|---|---|
| 36 | 6,6' | 5,5'-Cl | 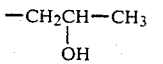 | —CH₂CH(OH)—CH₃ | acetate | brown | 2 |
| 37 | 6,6' | H | 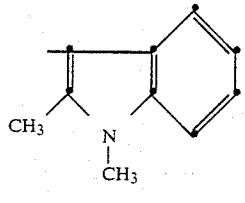 | —CH₂CH(OH)—CH₃ | acetate | brownish red | 2 |
| 38 | 6,6' | 5,5'-Cl | 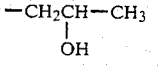 | —CH₂CH(OH)—CH₃ | acetate | brownish red | 2 |
| 39 | 6,6' | H | 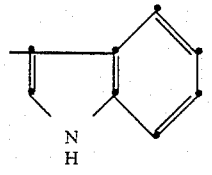 | —CH₂CH(OH)—CH₃ | acetate | violet | 2 |
| 40 | 6,6' | H | 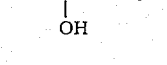 | —CH₂CH(OH)—CH₃ | acetate | scarlet | 2 |
| 41 | 6,6' | H | 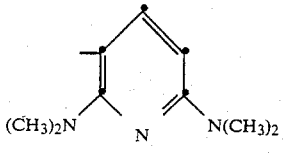 | —CH₂CH(OH)—CH₃ | acetate | scarlet | 2 |
| 42 | 6,6' | H | 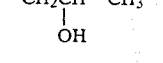 | —CH₂CH(OH)—CH₃ | acetate | scarlet | 2 |

Variables in chemical formulas: $R_1$, $R$, $An^{\ominus}$, $N^{\oplus}$.

TABLE-continued

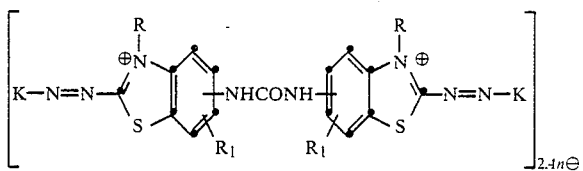

| Example | —NHCONH— Bridge position | R₁ | K | R | An | Colour on paper | Procedure analogous to Example |
|---|---|---|---|---|---|---|---|
| 43 | 6,6' | H | (structure with N, S, N(CH₃)₂) | —CH₂CH(OH)—CH₃ | acetate | blue | 2 |

EXAMPLE 44

50 parts of chemically bleached beech sulfite are mixed with 50 parts of bleached RKN 15 (freeness value 22° SR) and 2 parts of the dye according to Example 1 in water (pH 6, water hardness 10° dH, temperature 20° C., ratio of goods to liquor 1:40). After 15 minutes' stirring, paper sheets are produced on a Frank sheet-former.

The paper has been dyed in a very intense blue shade, and the waste liquor is completely colourless. The degree of exhaustion attained is practically 100%. The fastness to wet processing and fastness to light are excellent.

EXAMPLE 45

A paper web is produced from bleached beech sulfite (22° SR) on a continuously operating laboratory paper-making machine. Ten seconds before the breastbox, an aqueous solution of the dye according to Example 1 is fed continuously, with intense turbulence, into the fibre suspension (0.5% dyeing, ratio of goods to liquor 1:400, water hardness 10° dH, pH 6, temperature 20° C.).

There is imparted to the paper web a deeply coloured blue shade of medium intensity, the waste liquor being left completely colourless.

EXAMPLE 46

10 parts of cotton fabric (bleached mercerised cotton) are dyed, in a laboratory beam dyeing machine, in 200 parts of a liquor (water hardness 10° dH, pH 4, 3 circulations of the dye liquor per minute) containing 0.05 part of the dye according to Example 1. The temperature is raised in 60 minutes from 20° to 100° C., and then held constant for 15 minutes. The dye liquor is fully exhausted. There is imparted to the cotton fabric a deeply coloured blue dyeing which is distinguished by good fastness to light, and by very good fastness to wet processing.

When the same procedure is used to dye a textile fabric made from regenerated cellulose (viscose), there is obtained on this material, with the dye of Example 1, a deeply coloured blue dyeing having good fastness to light and very good fastness to wet processing.

What is claimed is:

1. A disazo compound of the formula $$\left[ K-N=N-\underset{\underset{R_1}{\overset{\overset{R}{\underset{\oplus}{N}}}{\bigcirc}}}{\bigvee_S}-NHCONH-\underset{\underset{R_1}{\overset{\overset{R}{\underset{\oplus}{N}}}{\bigcirc}}}{\bigvee_S}-N=N-K \right]_{2 \cdot An^{\ominus}}$$

wherein
the K groups independently of one another are each a coupling component selected from radicals of compounds of the group consisting of an acetoacetic acid anilide, a phenol, an aminopyrimidine, a pyridone, quinolone, pyrazolone, aminopyrazole, indole, aniline, aminopyridine, naphthol, naphthol carboxylic acid anilide, naphthylamine, aminothiazole, thiophene, tetrahydroquinoline and benzomorpholine, said groups being unsubstituted or substituted by (1) $C_1-C_4$-alkyl or $C_1-C_4$ alkyl substituted by $NH_2$, OH, or Cl, (2) $C_1-C_4$-alkoxy or $C_1-C_4$ alkoxy substituted by OH or Cl, (3) halogen from the group of F, Cl and Br, (4) $NO_2$, (5) OH, (6) CN or (7)

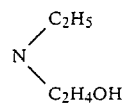

the R groups independently of one another are each $C_1-C_4$ alkyl which is unsubstituted or substituted by OH, halogen, $CONH_2$ or phenyl
the $R_1$ groups independently of one another are each (1) hydrogen, (2) $C_1-C_4$-alkyl which is unsubstituted or substituted by halogen, OH or CN, (3) $C_1-C_4$-alkoxy which is unsubstituted or substituted by $C_1-C_4$-alkyl, $C_1-C_4$-alkoxy, halogen or CN, or (4) halogen, and
An is an anion.

2. A disazo compound according to claim 1, wherein each K has the same meaning as the other K, each R the same meaning as the other R, and each $R_1$ the same meaning as the other $R_1$.

3. A disazo compound according to claim 2, wherein the —NHCONH— bridge is in the p-position with

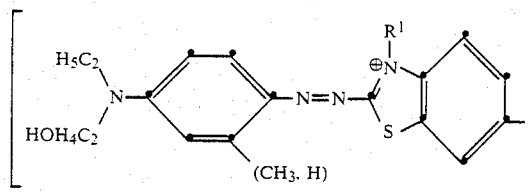

respect to the N atom of the benzothiazole group.

4. A disazo compound according to claim 1, wherein the coupling component K is the radical of aminopyrazole, indole, aniline, tetrahydroquinoline, benzomorpholine or naphthylamine.

5. A disazo compound according to claim 1 wherein the alkyl group R is —C$_2$H$_4$CONH$_2$, —CH$_2$—CHOH—CH$_3$ or —CH$_3$.

6. A disazo compound according to claim 1 wherein R$_1$ is hydrogen.

7. A disazo compound according to claim 1 which corresponds to the formula

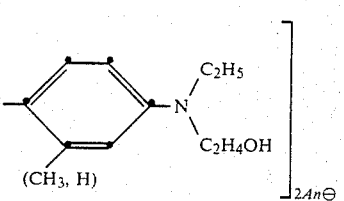

wherein
R' is C$_2$H$_4$CONH$_2$, CH$_2$—CHOH—CH$_3$ or CH$_3$, and
An is an anion.

8. A disazo compound of the formula

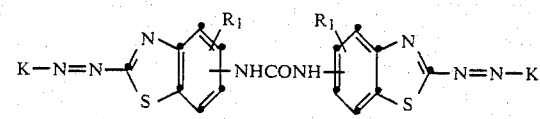

wherein the K and R$_1$ groups are as defined in claim 1.

* * * * *